(12) United States Patent
Sasaki et al.

(10) Patent No.: US 12,141,279 B2
(45) Date of Patent: Nov. 12, 2024

(54) BACKDOOR INSPECTION APPARATUS, BACKDOOR INSPECTION METHOD, AND NON-TRANSITORY COMPUTER READABLE MEDIUM

(71) Applicant: NEC Corporation, Tokyo (JP)

(72) Inventors: Takayuki Sasaki, Tokyo (JP); Yusuke Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 17/636,444

(22) PCT Filed: Aug. 29, 2019

(86) PCT No.: PCT/JP2019/033853
§ 371 (c)(1),
(2) Date: Feb. 18, 2022

(87) PCT Pub. No.: WO2021/038780
PCT Pub. Date: Mar. 4, 2021

(65) Prior Publication Data
US 2022/0292191 A1    Sep. 15, 2022

(51) Int. Cl.
*G06F 21/54* (2013.01)
*G06F 21/55* (2013.01)

(52) U.S. Cl.
CPC ............ *G06F 21/556* (2013.01); *G06F 21/54* (2013.01); *G06F 21/552* (2013.01); *G06F 21/554* (2013.01)

(58) Field of Classification Search
CPC ...... G06F 21/54; G06F 21/554; G06F 21/566; G06F 21/577; G06F 21/64; G06F 21/44
See application file for complete search history.

(56) References Cited

U.S. PATENT DOCUMENTS 8,117,660 B2 *  2/2012  Pan .................. G06F 21/54
                                                726/25
8,726,392 B1 *  5/2014  McCorkendale ....... G06F 21/52
                                                713/188

(Continued)

FOREIGN PATENT DOCUMENTS

JP    2008-217751 A    9/2008
JP    2010-262609 A    11/2010

(Continued)

OTHER PUBLICATIONS

Ahmad Firdaus Bin Zainal Abidin, Mobile Malware Anomaly-Based Detection Systems Using Static Analysis Features, 2017, Faculty of Computer Science and Information Technology, University of Malaya (Year: 2017).*

(Continued)

*Primary Examiner* — Carl G Colin
*Assistant Examiner* — Habibullah
(74) *Attorney, Agent, or Firm* — Michael Dryja

(57) ABSTRACT

In a backdoor inspection apparatus, a static analysis unit executes static analysis processing for a backdoor on each code block included in target software to be inspected to thereby specify a first code block and a condition, the first code possibly being the backdoor and the first code block being executed under the condition. Next, the static analysis unit outputs the target software to which first information indicating the specified first code block is added and second information indicating the specified condition to a dynamic analysis unit. The dynamic analysis unit controls dynamic (Continued)

analysis processing for the backdoor performed on the target software to which the first information is added based on the first information and the second information.

11 Claims, 9 Drawing Sheets

(56) References Cited

U.S. PATENT DOCUMENTS

| | | | | |
|---|---|---|---|---|
| 8,990,944 | B1 * | 3/2015 | Singh | G06F 21/53 |
| | | | | 726/24 |
| 9,009,823 | B1 * | 4/2015 | Ismael | G06F 21/53 |
| | | | | 726/22 |
| 9,159,035 | B1 * | 10/2015 | Ismael | G06F 9/45558 |
| 9,223,972 | B1 * | 12/2015 | Vincent | H04L 63/1425 |
| 9,230,099 | B1 * | 1/2016 | McCorkendale | G06F 21/60 |
| 9,306,960 | B1 * | 4/2016 | Aziz | G06F 21/554 |
| 9,306,974 | B1 * | 4/2016 | Aziz | H04L 63/1491 |
| 9,773,112 | B1 * | 9/2017 | Rathor | G06F 21/554 |
| 9,811,665 | B1 * | 11/2017 | Xu | G06F 21/562 |
| 9,838,147 | B2 * | 12/2017 | Xu | H04B 10/27 |
| 9,838,417 | B1 * | 12/2017 | Khalid | H04L 63/145 |
| 10,050,998 | B1 * | 8/2018 | Singh | H04L 63/145 |
| 10,075,455 | B2 * | 9/2018 | Zafar | H04L 63/1416 |
| 10,102,368 | B2 * | 10/2018 | Salajegheh | G06F 21/552 |
| 10,581,874 | B1 * | 3/2020 | Khalid | H04L 63/1425 |
| 10,637,880 | B1 * | 4/2020 | Islam | H04L 63/1425 |
| 10,805,340 | B1 * | 10/2020 | Goradia | H04L 63/145 |
| 11,003,773 | B1 * | 5/2021 | Fang | H04L 63/0263 |
| 11,552,986 | B1 * | 1/2023 | Templeman | H04L 63/1425 |
| 11,562,068 | B2 * | 1/2023 | Yavo | G06F 21/562 |
| 2013/0091571 | A1 * | 4/2013 | Lu | G06F 21/566 |
| | | | | 726/23 |
| 2018/0351989 | A1 * | 12/2018 | Nazir | H04L 41/0803 |

FOREIGN PATENT DOCUMENTS

| | | | |
|---|---|---|---|
| JP | 2018-501583 A | 1/2018 | |
| WO | WO-2014041561 A2 * | 3/2014 | G06F 11/3664 |
| WO | WO-2015192206 A1 * | 12/2015 | G06F 21/14 |
| WO | WO-2016109283 A1 * | 7/2016 | G06F 21/566 |
| WO | WO-2017163141 A1 * | 9/2017 | G06F 11/30 |
| WO | WO-2018127794 A1 * | 7/2018 | G06F 21/54 |

OTHER PUBLICATIONS

Authors: Hamoun Ghanbari, Marin Litoiu, "Identifying Implicitly Declared Self-Tuning Behavior through Dynamic Analysis", Seams' 09, Published: May 19, 2009 (Year: 2009).*

International Search Report for PCT Application No. PCT/JP2019/033853, mailed on Oct. 8, 2019.

Heishi, Shogo et al., "Proposal for Method of Detecting User Information Divulgences in Android Apps by Combining Static Taint Analysis with Dynamic Analysis", IPSJ SIG Technical Report (CSEC), vol. 2017-CSEC-076, No. 14, Feb. 23, 2017, pp. 1-8.

* cited by examiner

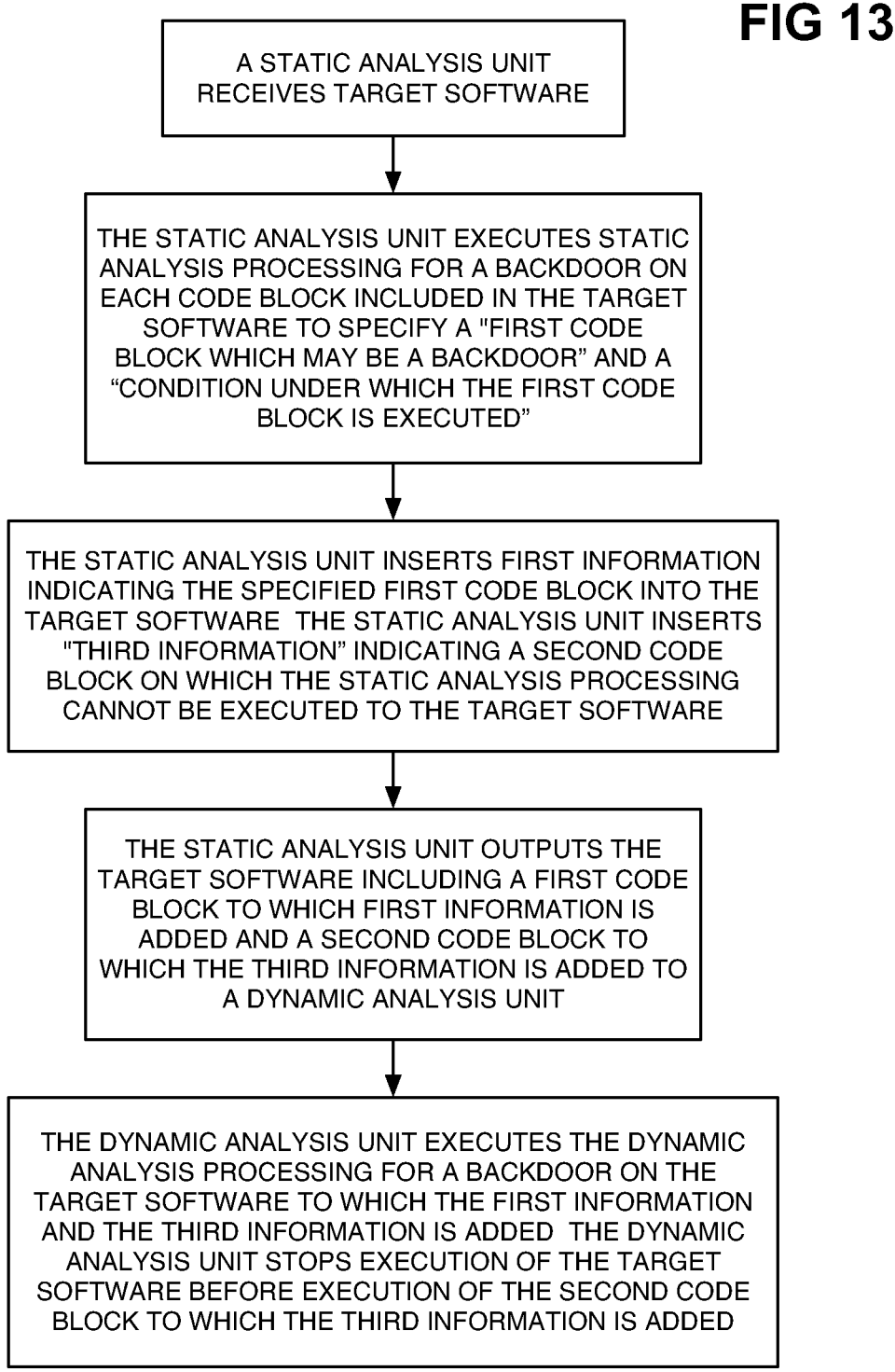

BACKDOOR INSPECTION APPARATUS, BACKDOOR INSPECTION METHOD, AND NON-TRANSITORY COMPUTER READABLE MEDIUM

This application is a National Stage Entry of PCT/JP2019/033853 filed on Aug. 29, 2019, the contents of all of which are incorporated herein by reference, in their entirety.

TECHNICAL FIELD

The present disclosure relates to a backdoor inspection apparatus, a backdoor inspection method, and a non-transitory computer readable medium.

BACKGROUND ART

A technique for analyzing software by static analysis and dynamic analysis has been proposed (e.g., Patent Literature 1).

Incidentally, infrastructure and enterprise systems are becoming more complex. For this reason, infrastructure and enterprise systems are not constructed by devices procured from only a single enterprise, and instead are constructed by devices externally procured from various enterprises and combining them.

Recently, however, a number of incidents have been reported in which hidden functions of both software (firmware) and hardware not known to a user or not expected by a user are discovered in these devices. That is, a number of incidents related to "backdoors" have been reported. The "backdoor" may be defined, for example, as a function that is not known to a user and is not desired by a user, and that is incorporated as part of software including a plurality of functions.

CITATION LIST

Patent Literature

Patent Literature 1: Japanese Unexamined Patent Application Publication No. 2008-217751

SUMMARY OF INVENTION

Technical Problem

The inventors have found that in the technique disclosed in Patent Literature 1, a backdoor is not considered, that is, a feature of a backdoor executed only when a specific condition is satisfied. Therefore, the backdoor may not be accurately analyzed by the technique disclosed in Patent Literature 1.

An object of the present disclosure is to provide a backdoor inspection apparatus, a backdoor inspection method, and a non-transitory computer readable medium capable of improving analysis accuracy for backdoors.

Solution to Problem

In a first example aspect, a backdoor inspection apparatus includes:

static analysis means for executing static analysis processing for a backdoor on each code block included in target software to be inspected to thereby specify a first code block and a condition, the first code possibly being the backdoor and the first code block being executed under the condition, and outputting the target software to which first information indicating the specified first code block is added and second information indicating the specified condition; and dynamic analysis means for controlling dynamic analysis processing for the backdoor performed on the target software to which the first information is added based on the first information and the second information.

In a second example aspect, a backdoor inspection method includes:

executing static analysis processing for a backdoor on each code block included in target software to be inspected to thereby specify a first code block and a condition, the first code possibly being the backdoor and the first code block being executed under the condition, and adding first information indicating the specified first code block to the target software; and controlling dynamic analysis processing for the backdoor performed on the target software to which the first information is added based on the first information and the condition.

In a third example aspect, a non-transitory computer readable medium storing a program for causing a backdoor inspection apparatus to execute:

executing static analysis processing for a backdoor on each code block included in target software to be inspected to thereby specify a first code block and a condition, the first code possibly being the backdoor and the first code block being executed under the condition, and adding first information indicating the specified first code block to the target software; and controlling dynamic analysis processing for the backdoor performed on the target software to which the first information is added based on the first information and the condition.

Advantageous Effects of Invention

According to the present disclosure, it is possible to provide a backdoor inspection apparatus, a backdoor inspection method, and a non-transitory computer readable medium capable of improving analysis accuracy for backdoors.

BRIEF DESCRIPTION OF DRAWINGS

FIG. 13 is a flowchart of a method according to the sixth example embodiment.

DESCRIPTION OF EMBODIMENTS

Example embodiments will be described below with reference to the drawings. In this example embodiment, the same or equivalent elements are denoted by the same reference signs, and repeated explanations are omitted.

First Example Embodiment

Figure 1:
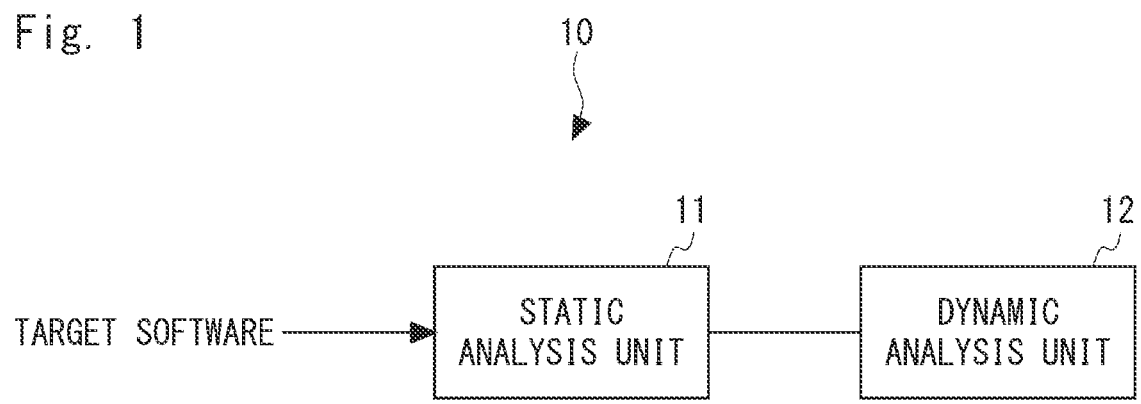
FIG. 1 is a block diagram showing an example of a backdoor inspection apparatus according to a first example embodiment.

FIG. 1 is a block diagram showing an example of a backdoor inspection apparatus according to a first example embodiment. In FIG. 1, a backdoor inspection apparatus 10 includes a static analysis unit 11 and a dynamic analysis unit 12.

The static analysis unit 11 receives software to be inspected (hereinafter referred to simply as "target software"). The target software may be pre-compiled source code or compiled binary code.

The static analysis unit 11 executes static analysis processing for a backdoor on each code block included in the target software to specify a "code block which may be a backdoor" (hereinafter referred to as a "first code block") and a "condition under which the first code block is executed". Next, the static analysis unit 11 inserts (embeds) information indicating the specified first code block (hereinafter may be referred to as "first information") into the target software. That is, the target software includes the first code block and the first information in association with each other. Thus, the first information can be used as a marker of the first code block. Next, the static analysis unit 11 outputs the target software into which the first information has been inserted and information indicating the specified condition (hereinafter may be referred to as "second information") to the dynamic analysis unit 12. For example, the specified condition may include an input value when the first code block is executed. In this case, the second information includes this input value.

In the above description, it is assumed that the first information is embedded in the target software, but the present disclosure is not limited to this. For example, the static analysis unit 11 may attach the first information as additional information to the target software. In short, the first information may be added to the target software in any manner.

The dynamic analysis unit 12 controls dynamic analysis processing for a backdoor performed on the target software to which the first information is added based on the first information and the second information. For example, when the second information includes the input value, the dynamic analysis unit 12 uses the input value included in the second information as an input of the first code block at the time of the dynamic analysis processing performed on the first code block. Thus, since the backdoor is surely executed at the time of the dynamic analysis, the dynamic analysis on the backdoor can be surely executed.

As described above, according to the first example embodiment, in the backdoor inspection apparatus 10, the static analysis unit 11 executes the static analysis processing for a backdoor on each code block included in the target software, thereby specifying the first code block which may be a backdoor and the condition under which the first code block is executed. Then, the static analysis unit 11 outputs the target software to which the first information is added indicating the specified first code block and the second information indicating the specified condition to the dynamic analysis unit 12. The dynamic analysis unit 12 controls the dynamic analysis processing for a backdoor performed on the target software to which the first information is added based on the first information and the second information.

According to the configuration of the backdoor inspection apparatus 10, a backdoor can be surely executed by the dynamic analysis processing, so that the dynamic analysis for the backdoor can be surely executed. In this way, the analysis accuracy of the backdoor can be improved.

Second Example Embodiment

Figure 2:
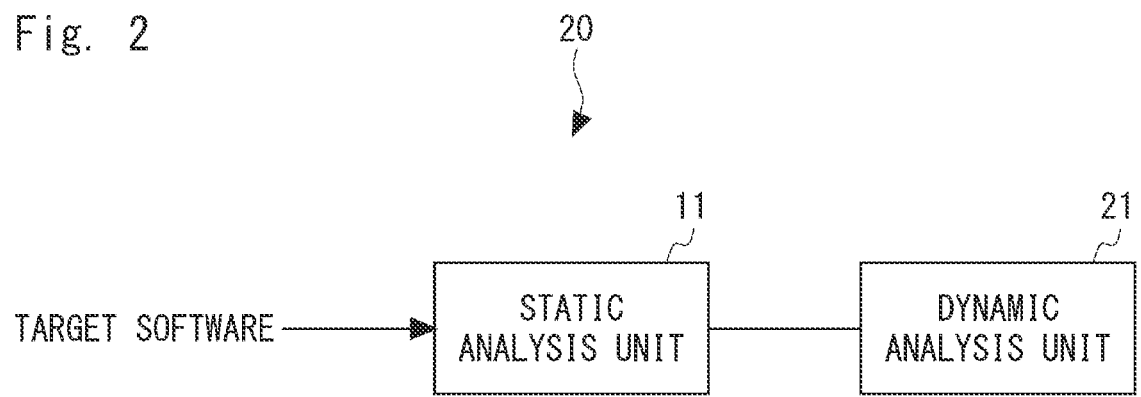
FIG. 2 shows an example of a backdoor inspection apparatus according to a second example embodiment.

FIG. 2 is a block diagram showing an example of a backdoor inspection apparatus according to a second example embodiment. In FIG. 2, a backdoor inspection apparatus 20 includes the static analysis unit 11 and a dynamic analysis unit 21.

The dynamic analysis unit 21 receives target software including a code block not to which first information is added and a first code block to which the first information is added from the static analysis unit 11. Then, the dynamic analysis unit 21 collects logs in accordance with a "first log collection level" at the time of the dynamic analysis processing performed on the code block to which the first information is not added. That is, when a code block to which the first information is not added is executed, the dynamic analysis unit 21 collects logs in accordance with the "first log collection level". On the other hand, the dynamic analysis unit 21 collects logs in accordance with a "second log collection level" at the time of the dynamic analysis processing performed on the first code block to which the first information is added. That is, when the first code block to which the first information is added is executed, the dynamic analysis unit 21 collects logs in accordance with the "second log collection level".

The second log collection level has a higher log detail level than that of the first log collection level. Thus, the detailed logs can be collected when the code block determined by the static analysis unit 11 that it may be a backdoor is executed, and the analysis accuracy of the backdoor can be improved.

MODIFIED EXAMPLE

The above description has been made based on the assumption that the static analysis unit 11 according to the second example embodiment outputs the target software to which the first information is added and the second information to the dynamic analysis unit 21 in a manner similar to that of the first example embodiment, but this example embodiment is not limited to this. For example, the static analysis unit 11 according to the second example embodiment may not specify the above condition or output the second information. That is, in the backdoor inspection apparatus 20 according to this modified example, the static analysis unit 11 executes the static analysis processing for a backdoor on each code block included in the target software to specify the first code block which may be a backdoor. Next, the static analysis unit 11 outputs the target software to which the first information is added indicating the specified first code block to the dynamic analysis unit 21. The dynamic analysis unit 21 controls the dynamic analysis processing for a backdoor performed on the target software to which the first information is added based on the first information. Specifically, the dynamic analysis unit 21 collects logs in accordance with the "first log collection level" at the time of the dynamic analysis processing performed on a code block to which the first information is not added. On the other hand, the dynamic analysis unit 21 collects logs in accordance with the "second log collection level" at the time of the dynamic analysis processing performed on the first code block to which the first information is added.

Third Example Embodiment

Figure 3:
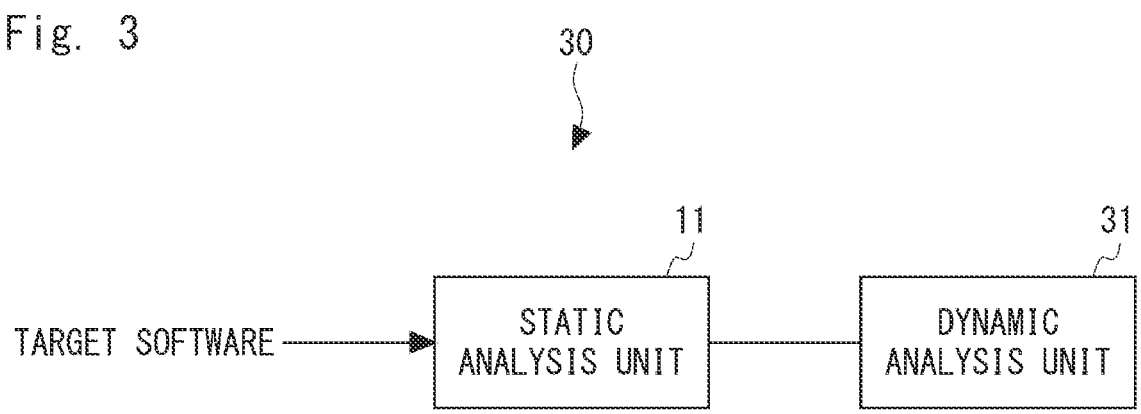
FIG. 3 is a block diagram showing an example of a backdoor inspection apparatus according to a third example embodiment.

FIG. 3 is a block diagram showing an example of a backdoor inspection apparatus according to a third example embodiment. In FIG. 3, a backdoor inspection apparatus 30 includes the static analysis unit 11 and a dynamic analysis unit 31.

The dynamic analysis unit 31 receives target software including a code block not to which first information is added and a first code block to which the first information is added from the static analysis unit 11. Next, the dynamic analysis unit 31 outputs a notification signal which gives a notification about a point to be analyzed at the time of the dynamic analysis processing performed on the first code block to which the first information is added. The output notification signal is received by a presentation apparatus (not shown). The presentation apparatus (not shown) may display a point to be analyzed or present the point to be analyzed by a voice. This allows the analyst to analyze a backdoor according to the point to be analyzed displayed or presented by a voice.

MODIFIED EXAMPLE

The above description has been made based on the assumption that the static analysis unit 11 according to the third example embodiment outputs the target software to which the first information is added and the second information to the dynamic analysis unit 31 in a manner similar to that of the first example embodiment, but this example embodiment is not limited to this. For example, the static analysis unit 11 according to the third example embodiment may not specify the above condition or output the second information. That is, in the backdoor inspection apparatus 30 according to this modified example, the static analysis unit 11 executes the static analysis processing for a backdoor on each code block included in the target software to specify the first code block which may be a backdoor. Next, the static analysis unit 11 outputs the target software to which the first information is added indicating the specified first code block to the dynamic analysis unit 31. The dynamic analysis unit 31 controls dynamic analysis processing for a backdoor performed on the target software to which the first information is added based on the first information. Specifically, the dynamic analysis unit 31 outputs a notification signal for giving a notification about a point to be analyzed at the time of the dynamic analysis processing performed on the first code block to which the first information is added.

Fourth Example Embodiment

Figure 4:
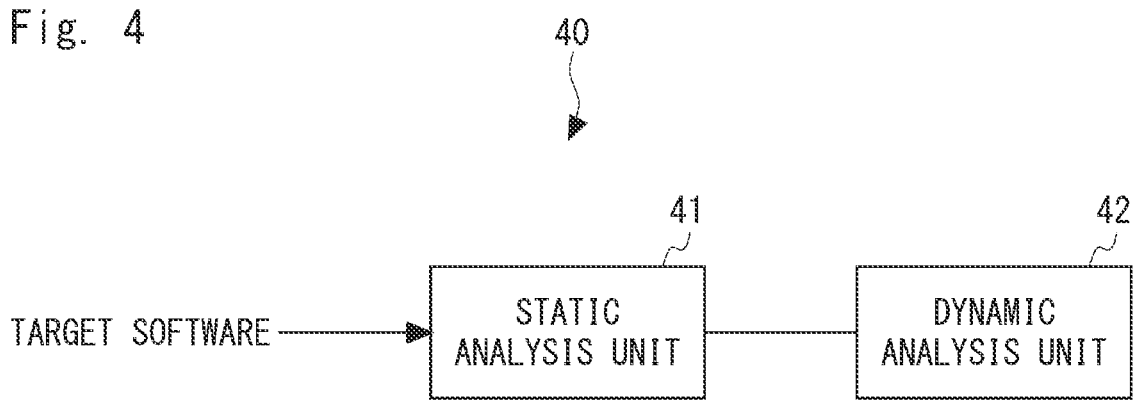
FIG. 4 is a block diagram showing an example of a backdoor inspection apparatus according to a fourth example embodiment.

FIG. 4 is a block diagram showing an example of a backdoor inspection apparatus according to a fourth example embodiment. In FIG. 4, a backdoor inspection apparatus 40 includes a static analysis unit 41 and a dynamic analysis unit 42.

In a manner similar to the static analysis unit 11 according to the first example embodiment, the static analysis unit 41 executes the static analysis processing for a backdoor on each code block included in target software to specify a first code block which may be a backdoor. Next, the static analysis unit 41 outputs the target software to which first information indicating the specified first code block is added to the dynamic analysis unit 42. Here, the static analysis unit 41 inserts an "alert output instruction code" as the first information into the target software. The position where the "alert output instruction code" is inserted in the target software may be, for example, right before or right after the first code block. Note that the static analysis unit 41 may specify the above condition and output the second information in a manner similar to that of the static analysis unit 11 according to the first example embodiment, or may not specify the above condition or output the second information.

The dynamic analysis unit 42 outputs an alert signal at the time of the dynamic analysis processing performed on the first code block to which first information is added. The output alert signal is received by the presentation apparatus (not shown). The presentation apparatus (not shown) may display an alert or present the alert by a voice. By doing so, an analyst can analyze the backdoor in more detail when triggered by the alert.

Fifth Example Embodiment

In the second example embodiment, at the time of the dynamic analysis processing performed on the first code block to which the first information is added, the logs are collected in accordance with the increased log detail level. On the other hand, in a fifth example embodiment, a value of a determination threshold used for the determination as to whether or not each code block corresponds to a backdoor in the dynamic analysis is adjusted in the determination for the code block to which the first information is not added and the determination for the first code block to which the first information is added.

Figure 5:
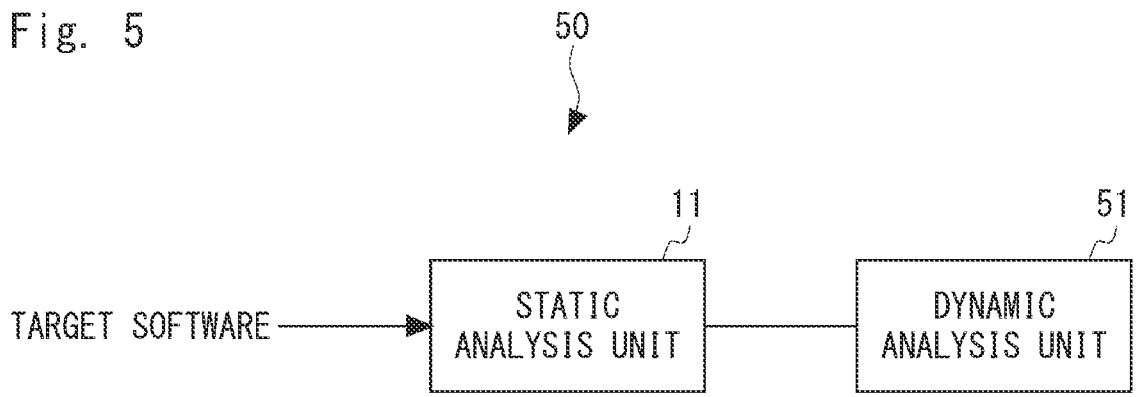
FIG. 5 is a block diagram showing an example of a backdoor inspection apparatus according to a fifth example embodiment.

FIG. 5 is a block diagram showing an example of a backdoor inspection apparatus according to the fifth example embodiment. In FIG. 5, a backdoor inspection apparatus 50 includes the static analysis unit 11 and a dynamic analysis unit 51.

The dynamic analysis unit 51 determines whether or not each code block corresponds to a backdoor based on a value of a "security parameter" used for determining the backdoor in the dynamic analysis and the "determination threshold". The dynamic analysis unit 51 adjusts the value of the determination threshold at the time of determination for the code block to which the first information is not added and at the time of determination for the first code block to which the first information is added. For example, even if the value of the security parameter obtained when the code block to which the first information is not added is executed is the same as the value of the security parameter obtained when the first code block to which the first information is added is executed, the value of the determination threshold is adjusted so that the first code block to which the first information is added is easily determined to be a backdoor. That is, when a determination is made on the first code block to which the first information is added, the value of the determination threshold is adjusted so that a more severe determination is made.

MODIFIED EXAMPLE

The above description has been made based on the assumption that the static analysis unit 11 according to the fifth example embodiment outputs the target software to which the first information is added and the second information to the dynamic analysis unit 51 in a manner similar to that of the first example embodiment, but this example embodiment is not limited to this. For example, the static analysis unit 11 according to the fifth example embodiment may not specify the above condition or output the second information. That is, in the backdoor inspection apparatus 50 according to this modified example, the static analysis unit 11 executes the static analysis processing for a backdoor on each code block included in the target software to specify the first code block which may be a backdoor. Next, the static analysis unit 11 outputs the target software to which the first information is added indicating the specified first code block to the dynamic analysis unit 51. The dynamic analysis unit 51 adjusts the value of the determination threshold at the time of determination for a code block to which the first information is not added and at the time of determination for the first code block to which the first information is added.

Sixth Example Embodiment

In some cases, a static analysis cannot be performed (cannot be completed). For example, there are cases in which symbolic execution cannot be performed due to "a path explosion" in which the number of paths explodes when symbolic execution is performed. The sixth example embodiment relates to an example embodiment in consideration of a case in which a static analysis cannot be performed.

Figure 6:
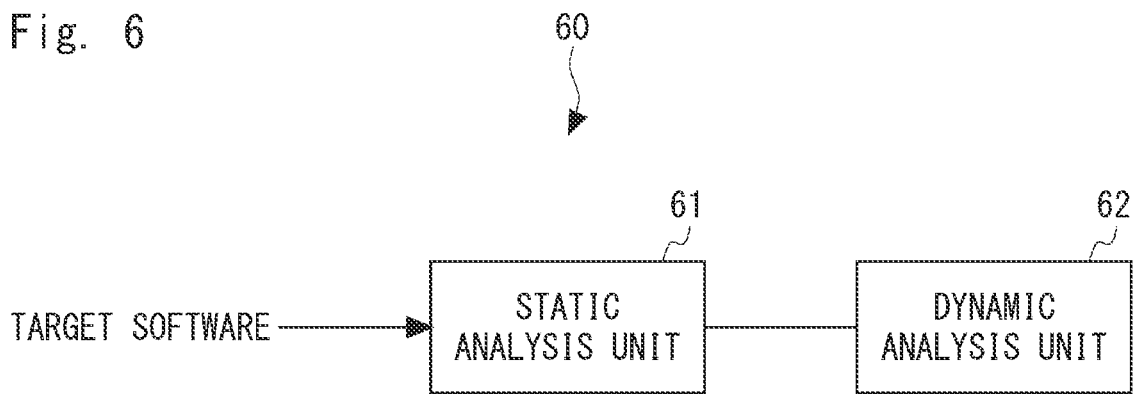
FIG. 6 is a block diagram showing an example of a backdoor inspection apparatus according to a sixth example embodiment.

FIG. 6 is a block diagram showing an example of a backdoor inspection apparatus according to the sixth example embodiment. In FIG. 6, a backdoor inspection apparatus 60 includes a static analysis unit 61 and a dynamic analysis unit 62.

The static analysis unit 61 executes the static analysis processing for a backdoor on each code block included in the target software to specify a first code block which may be a backdoor. Next, the static analysis unit 61 adds first information indicating the specified first code block to the target software. Note that the static analysis unit 61 may specify the above condition and output the second information in a manner similar to that of the static analysis unit 11 according to the first example embodiment, or may not specify the above condition or output the second information.

Further, the static analysis unit 61 adds "third information" indicating a code block on which the static analysis processing cannot be executed due to the "path explosion" (hereinafter may be referred to as a "second code block") to the target software.

Next, the static analysis unit 61 outputs the target software to which the first information is added and the third information to the dynamic analysis unit 62. Here, the "third information" may be a "hook" for stopping execution of the second code block.

The dynamic analysis unit 62 executes the dynamic analysis processing for a backdoor on the target software to which the first information and the third information is added. For example, the dynamic analysis unit 62 stops execution of the target software before execution of the second code block to which the third information is added. Further, the dynamic analysis unit 62 may output a notification signal before execution of the second code block.

As described above, according to the sixth example embodiment, in the backdoor inspection apparatus 60, the static analysis unit 61 outputs the target software to which the "third information" indicating the second code block for which the static analysis processing could not be executed is added. The dynamic analysis unit 62 executes the dynamic analysis processing for a backdoor on the target software to which the third information is added.

According to the backdoor inspection apparatus 60, the second code block on which the static analysis processing could not be executed can be treated in the same manner as the first code block which is determined as possibly being a backdoor in the static analysis processing. In this way, the analysis accuracy of the backdoor can be improved.

The dynamic analysis unit 62 may have the same functions as the functions of the dynamic analysis unit 21 according to the second example embodiment, the dynamic analysis unit 31 according to the third example embodiment, the dynamic analysis unit 42 according to the fourth example embodiment, and the dynamic analysis unit 51 according to the fifth example embodiment.

Other Example Embodiment

<1> The "first information" according to the first example embodiment may be a "stop code" for stopping execution of the target software. In this case, the dynamic analysis unit 12 stops execution of the target software before execution of the first code block to which the first information is added. In this case, the static analysis unit 11 may not specify the above condition or output the second information.

<2> The "first information" according to the first example embodiment may be an "isolation instruction code". In this case, the dynamic analysis unit 12 outputs an isolation instruction signal for isolating the backdoor inspection apparatus 10 to a firewall (not shown) before execution of the first code block to which the first information is added.

<3> The above description has been made based on the assumption that the static analysis and the dynamic analysis are performed by one backdoor inspection apparatus, but the present disclosure is not limited to this. For example, a backdoor inspection apparatus may perform a static analysis while another apparatus on a network may perform a dynamic analysis.

<4> A static analysis is performed, for example, at the time of system development. On the other hand, a dynamic analysis may be performed at the time of system development or when the system is actually in operation.

<5> By setting up "access control policies" such as SELinux (registered trademark) and App Armor, the damage when backdoors are mixed in can be reduced. Therefore, the backdoor inspection apparatus according to each example embodiment may further include a policy generation unit for generating an "access control policy" including an "access prohibition rule" based on an operation performed when a first code block specified in the dynamic analysis processing and which may be a backdoor is executed. Alternatively, the backdoor inspection apparatus according to each example embodiment may further include a policy generation unit for generating an "access control policy" including an "access permission rule" based on an operation when a code block determined that it is not a backdoor in the dynamic analysis processing is executed.

Figure 7:
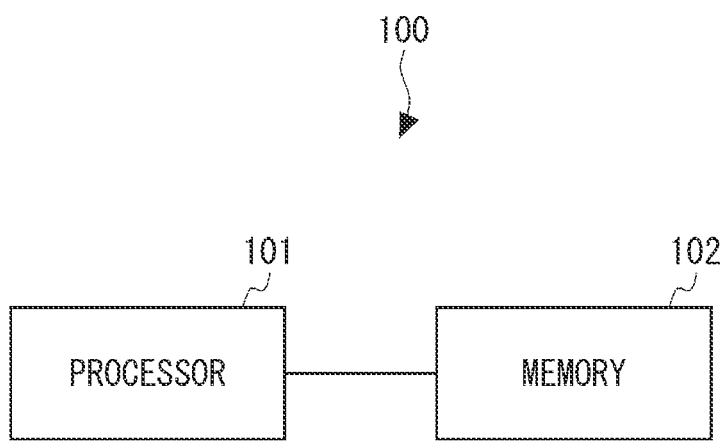
FIG. 7 shows an example of a hardware configuration of a backdoor inspection apparatus.
Figure 8:
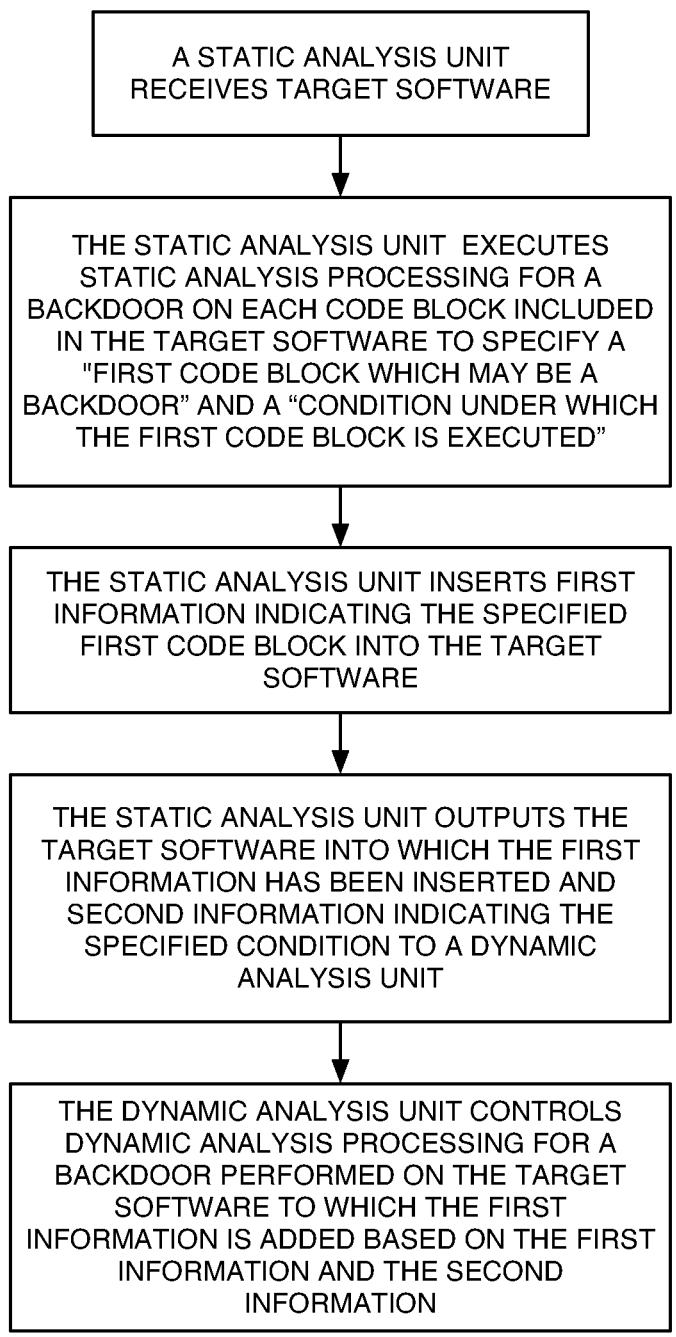
FIG. 8 is a flowchart of a method according to the first example embodiment.
Figure 9:
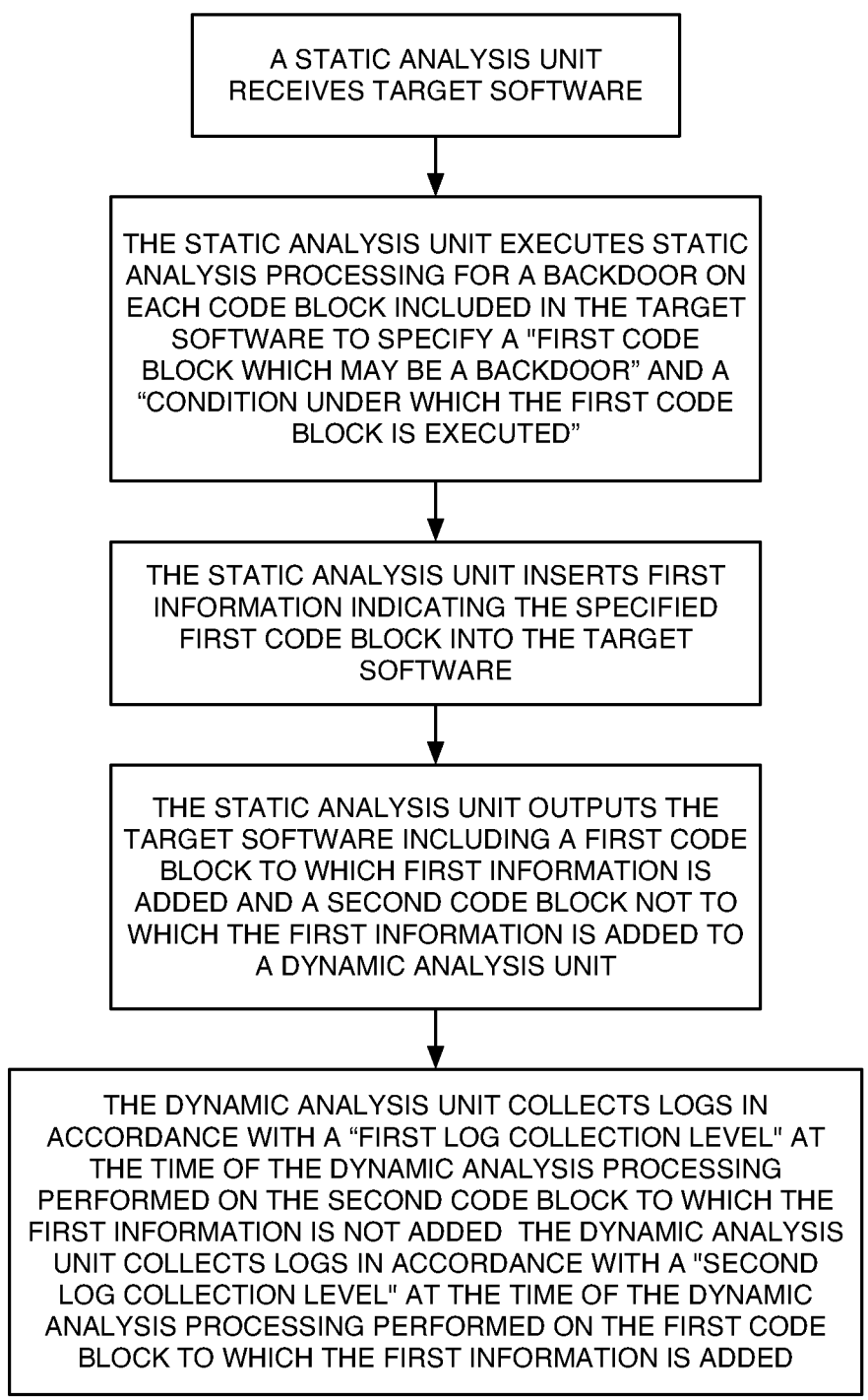
FIG. 9 is a flowchart of a method according to the second example embodiment.
Figure 10:
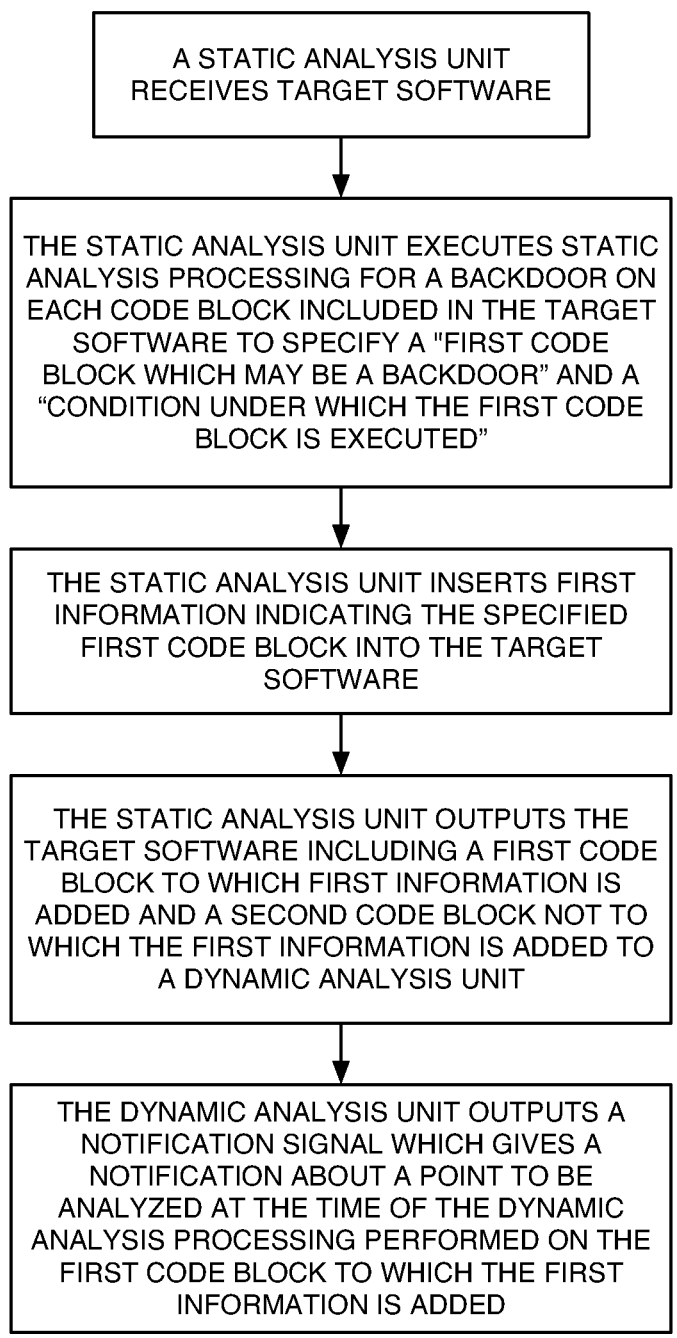
FIG. 10 is a flowchart of a method according to the third example embodiment.
Figure 11:
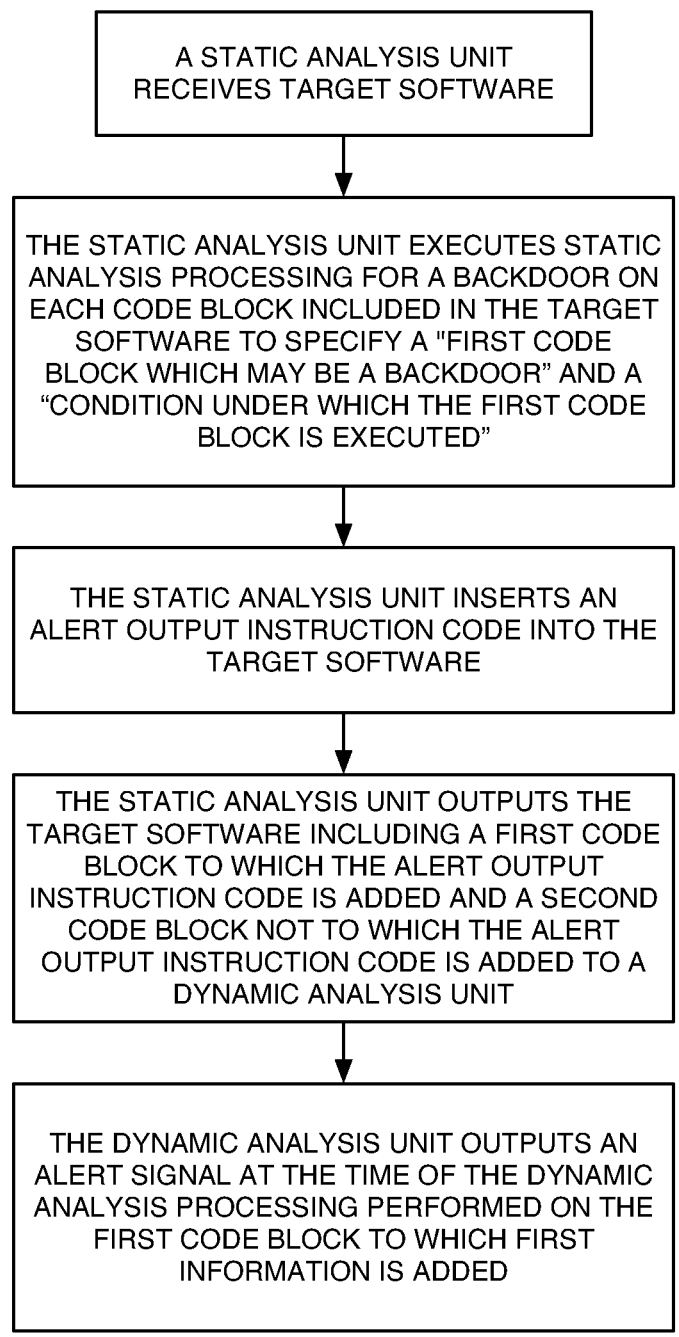
FIG. 11 is a flowchart of a method according to the fourth example embodiment.
Figure 12:
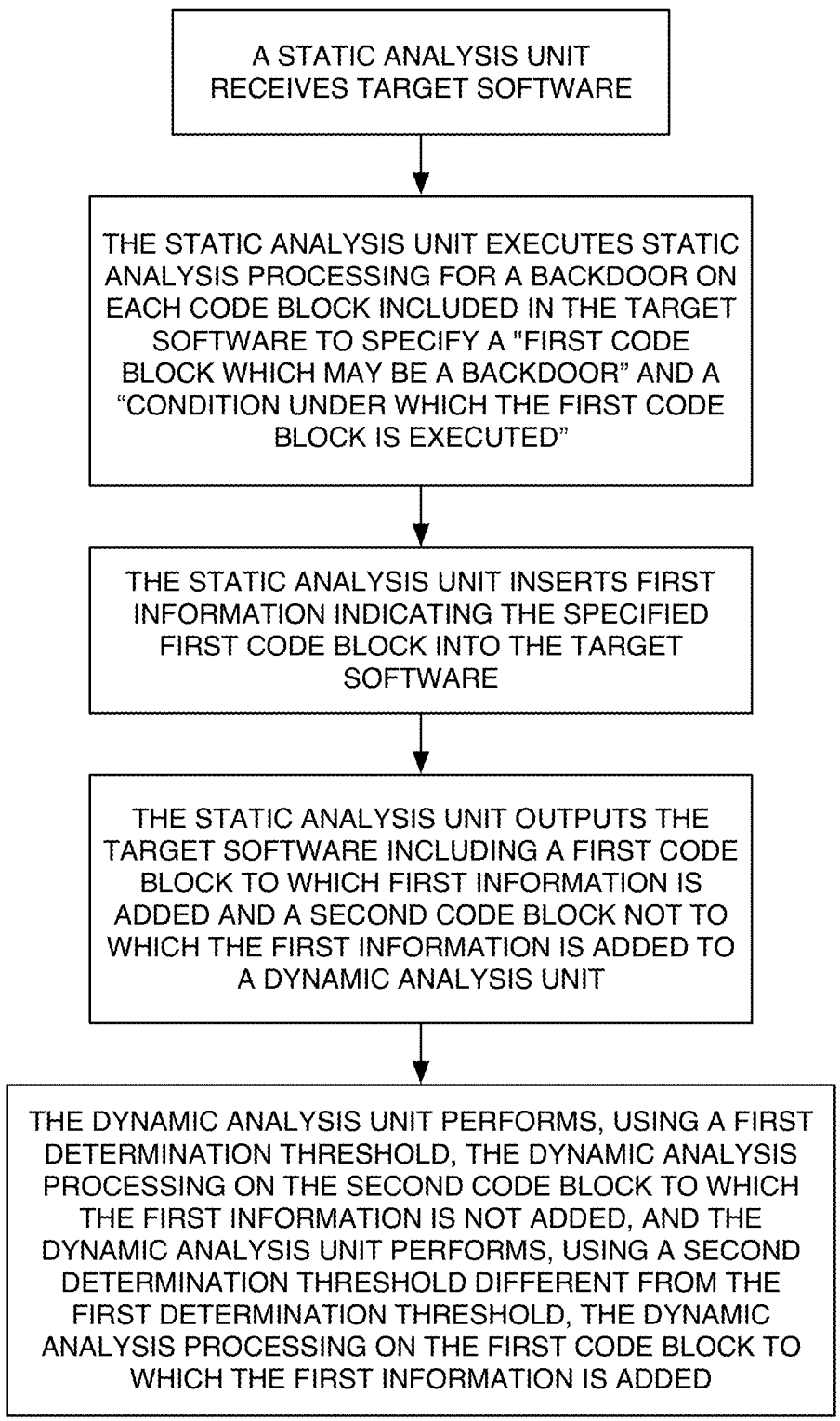
FIG. 12 is a flowchart of a method according to the fifth example embodiment.

<6> FIG. 7 shows an example of a hardware configuration of the backdoor inspection apparatus. In FIG. 7, a backdoor inspection apparatus 100 includes a processor 101 and a memory 102. The processor 101 may be, for example, a microprocessor, a MPU (Micro Processing Unit), or a CPU (Central Processing Unit). The processor 101 may include a plurality of processors. The memory 102 is composed of a combination of a volatile memory and a non-volatile memory. The memory 102 may include a storage separated from the processor 101. In this case, the processor 101 may access the memory 102 through an I/O interface (not shown).

The backdoor inspection apparatuses 10, 20, 30, 50, and 60 according to the first to sixth example embodiments may each have the hardware configuration shown in FIG. 7. The static analysis units 11, 41, and 61 and the dynamic analysis units 12, 21, 31, 42, 51, and 62 of the backdoor inspection apparatuses 10, 20, 30, 40, 50, and 60 according to the first to sixth example embodiments may be implemented by the processor 101 reading and executing a program stored in the memory 102. The program can be stored and provided to the backdoor inspection apparatuses 10, 20, 30, 40, 50, and 60 using any type of non-transitory computer readable media. Examples of non-transitory computer readable media include magnetic storage media (such as floppy disks, magnetic tapes, hard disk drives, etc.), optical magnetic storage media (e.g. magneto-optical disks). Examples of non-transitory computer readable medium further include CD-ROM (Read Only Memory), CD-R, and CD-R/W. Examples of non-transitory computer readable medium further include semiconductor memories. Examples of semiconductor memories include mask ROM, PROM (Programmable ROM), EPROM (erasable PROM), flash ROM, RAM (random access memory), etc. The program may be provided to the backdoor inspection apparatuses 10, 20, 30, 40, 50, and 60 using any type of transitory computer readable media. Examples of transitory computer readable media include electric signals, optical signals, and electromagnetic waves. Transitory computer readable media can provide the program to the backdoor inspection apparatuses 10, 20, 30, 40, 50, and 60 via a wired communication line (e.g. electric wires, and optical fibers) or a wireless communication line.

Although the present disclosure has been described with reference to the above example embodiments, the present disclosure is not limited to the above. Various changes can be made to the configuration and details of the disclosure within the scope of the disclosure that can be understood by those skilled in the art.

The whole or part of the exemplary embodiments disclosed above can be described as, but not limited to, the following supplementary notes.

(Supplementary Note 1)
A backdoor inspection apparatus comprising:
static analysis means for executing static analysis processing for a backdoor on each code block included in target software to be inspected to thereby specify a first code block and a condition, the first code possibly being the backdoor and the first code block being executed under the condition, and outputting the target software to which first information indicating the specified first code block is added and second information indicating the specified condition; and
dynamic analysis means for controlling dynamic analysis processing for the backdoor performed on the target software to which the first information is added based on the first information and the second information.

(Supplementary Note 2)
The backdoor inspection apparatus according to Supplementary note 1, wherein
the specified condition includes an input value when the first code block is executed, and
the second information includes the input value.
(Supplementary Note 3)
The backdoor inspection apparatus according to Supplementary note 2, wherein
the dynamic analysis means uses the input value as an input of the first code block at the time of the dynamic analysis processing performed on the first code block.
(Supplementary Note 4)
The backdoor inspection apparatus according to any one of Supplementary notes 1 to 3, wherein
the dynamic analysis means collects logs in accordance with a first log collection level at the time of the dynamic analysis processing performed on a code block to which the first information is not added, and collects logs in accordance with a second log collection level at the time of the dynamic analysis processing performed on the first code block to which the first information is added, a log detail level of the second log detail level being higher than that of the first log collection level.
(Supplementary Note 5)
The backdoor inspection apparatus according to any one of Supplementary notes 1 to 4, wherein
the dynamic analysis means outputs a notification signal which gives a notification about a point to be analyzed at the time of the dynamic analysis processing performed on the first code block to which the first information is added.
(Supplementary Note 6)
The backdoor inspection apparatus according to Supplementary note 1, wherein
the first information includes an alert output instruction code, and
the dynamic analysis means outputs an alert signal at the time of the dynamic analysis processing performed on the first code block to which the first information is added.
(Supplementary Note 7)
The backdoor inspection apparatus according to any one of Supplementary notes 1 to 6, wherein
the static analysis means adds, to the target software, third information indicating a second code block, the static analysis processing not being executed on the second code block, and
the dynamic analysis means executes the dynamic analysis processing for the backdoor on the target software to which the third information is added.
(Supplementary Note 8)
The backdoor inspection apparatus according to Supplementary note 7, wherein
the third information includes a hook for stopping execution of the second code block, and
the dynamic analysis means stops execution of the target software before executing the second code block to which the third information is added.
(Supplementary Note 9)
The backdoor inspection apparatus according to Supplementary note 8, wherein
the dynamic analysis means outputs a notification signal before executing the second code block.
(Supplementary Note 10)
The backdoor inspection apparatus according to any one of Supplementary notes 1 to 3, wherein
the dynamic analysis means determines whether or not each of the code blocks corresponds to the backdoor based on a value of a security parameter used for determining the backdoor and a value of a determination threshold at the time of a dynamic analysis, and adjusts the value of the determination threshold at the time of determining a code block to which the first information is not added and at the time of determining the first code block to which the first information is added.

(Supplementary Note 11)

A backdoor inspection method comprising:

executing static analysis processing for a backdoor on each code block included in target software to be inspected to thereby specify a first code block and a condition, the first code possibly being the backdoor and the first code block being executed under the condition, and adding first information indicating the specified first code block to the target software; and controlling dynamic analysis processing for the backdoor performed on the target software to which the first information is added based on the first information and the condition.

(Supplementary Note 12)

A non-transitory computer readable medium storing a program for causing a backdoor inspection apparatus to execute:

executing static analysis processing for a backdoor on each code block included in target software to be inspected to thereby specify a first code block and a condition, the first code possibly being the backdoor and the first code block being executed under the condition, and adding first information indicating the specified first code block to the target software; and controlling dynamic analysis processing for the backdoor performed on the target software to which the first information is added based on the first information and the condition.

REFERENCE SIGNS LIST

10 BACKDOOR INSPECTION APPARATUS
11 STATIC ANALYSIS UNIT
12 DYNAMIC ANALYSIS UNIT
20 BACKDOOR INSPECTION APPARATUS
21 DYNAMIC ANALYSIS UNIT
30 BACKDOOR INSPECTION APPARATUS
31 DYNAMIC ANALYSIS UNIT
40 BACKDOOR INSPECTION APPARATUS
41 STATIC ANALYSIS UNIT
42 DYNAMIC ANALYSIS UNIT
50 BACKDOOR INSPECTION APPARATUS
51 DYNAMIC ANALYSIS UNIT
60 BACKDOOR INSPECTION APPARATUS
61 STATIC ANALYSIS UNIT
62 DYNAMIC ANALYSIS UNIT

What is claimed is:

1. A backdoor inspection apparatus comprising:
at least one processor and at least one memory;
a static analysis unit implemented at least by the hardware and that:
executes static analysis processing for a backdoor on each of a plurality of code blocks included in target software to be inspected to specify a first code block that is potentially the backdoor and a condition under which the first code block is being executed; and
outputs the target software to which first information indicating the specified first code block is added and second information indicating the specified condition; and a dynamic analysis unit implemented at least by the hardware and that controls dynamic analysis processing for the backdoor performed on the target software to which the first information is added based on the first information and the second information, by:
determining whether or not each of the plurality of code blocks corresponds to the backdoor based on a value of a security parameter used for determining the backdoor and a value of a determination threshold for determining the backdoor at a time of the dynamic analysis; and
adjusting the value of the determination threshold at a time of determining a code block to which the first information is not added and at a time of determining the first code block to which the first information is added.

2. The backdoor inspection apparatus according to claim 1, wherein
the specified condition includes an input value when the first code block is executed, and
the second information includes the input value.

3. The backdoor inspection apparatus according to claim 2, wherein
the dynamic analysis unit uses the input value as an input of the first code block at the time of the dynamic analysis processing performed on the first code block.

4. The backdoor inspection apparatus according to claim 1, wherein
the dynamic analysis unit collects logs in accordance with a first log collection level at the time of the dynamic analysis processing performed on the code block to which the first information is not added, and collects logs in accordance with a second log collection level at the time of the dynamic analysis processing performed on the first code block to which the first information is added, a log detail level of the second log collection level being higher than that of the first log collection level.

5. The backdoor inspection apparatus according to claim 1, wherein
the dynamic analysis unit outputs a notification signal that provides a notification about a point to be analyzed at the time of the dynamic analysis processing performed on the first code block to which the first information is added.

6. The backdoor inspection apparatus according to claim 1, wherein
the first information includes an alert output instruction code, and
the dynamic analysis unit outputs an alert signal at the time of the dynamic analysis processing performed on the first code block to which the first information is added.

7. The backdoor inspection apparatus according to claim 1, wherein
the static analysis unit adds, to the target software, third information indicating a second code block, the static analysis processing not being executed on the second code block, and
the dynamic analysis unit executes the dynamic analysis processing for the backdoor on the target software to which the third information is added.

8. The backdoor inspection apparatus according to claim 7, wherein
the third information includes a hook for stopping execution of the second code block, and the dynamic analysis unit stops execution of the target software before executing the second code block to which the third information is added.

9. The backdoor inspection apparatus according to claim 8, wherein
the dynamic analysis unit outputs a notification signal before executing the second code block.

10. A backdoor inspection method performed by a computer and comprising:
executing static analysis processing for a backdoor on each of a plurality of code blocks included in target software to be inspected to specify a first code block that is potentially the backdoor and a condition under which the first code block is being executed;
adding first information indicating the specified first code block to the target software; and
controlling dynamic analysis processing for the backdoor performed on the target software to which the first information is added based on the first information and the condition, including:
determining whether or not each of the plurality of code blocks corresponds to the backdoor based on a value of a security parameter used for determining the backdoor and a value of a determination threshold for determining the backdoor at a time of the dynamic analysis; and
adjusting the value of the determination threshold at a time of determining a code block to which the first information is not added and at a time of determining the first code block to which the first information is added.

11. A non-transitory computer readable medium storing a program executable by a backdoor inspection apparatus to perform processing comprising:
executing static analysis processing for a backdoor on each of a plurality of code blocks included in target software to be inspected to specify a first code block that is potentially the backdoor and a condition under which the first code block is being executed;
adding first information indicating the specified first code block to the target software; and
controlling dynamic analysis processing for the backdoor performed on the target software to which the first information is added based on the first information and the condition, including:
determining whether or not each of the plurality of code blocks corresponds to the backdoor based on a value of a security parameter used for determining the backdoor and a value of a determination threshold for determining the backdoor at a time of the dynamic analysis; and
adjusting the value of the determination threshold at a time of determining a code block to which the first information is not added and at a time of determining the first code block to which the first information is added.

* * * * *